Dec. 8, 1953   A. C. PURPURA   2,662,160
CONTROL SYSTEM SUITABLE FOR AUTOMATIC COFFEE MAKERS
Filed Dec. 7, 1949
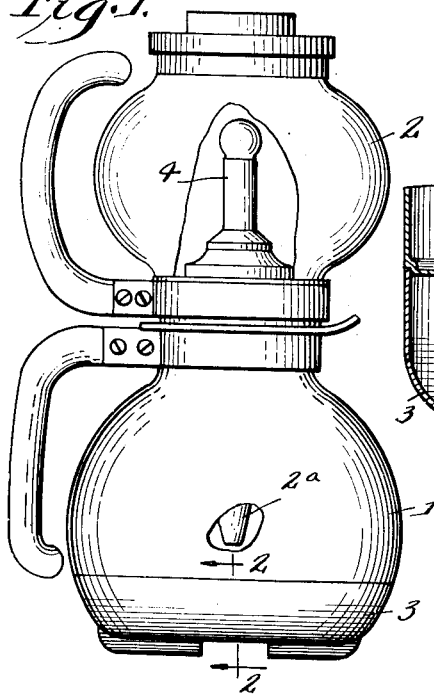
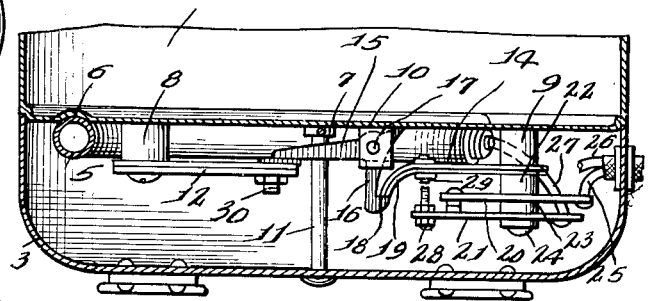
Inventor
August C. Purpura
By Wm F Freudenreich
Attorney Patented Dec. 8, 1953

2,662,160

UNITED STATES PATENT OFFICE 2,662,160

CONTROL SYSTEM SUITABLE FOR AUTOMATIC COFFEE MAKERS

August C. Purpura, Chicago, Ill., assignor to Sunbeam Corporation, Chicago, Ill., a corporation of Illinois Application December 7, 1949, Serial No. 131,581

9 Claims. (Cl. 219—43)

In my prior application, Ser. No. 20,205, filed Apr. 10, 1948, now Patent 2,504,728 for an Automatic Coffee Maker, of which the present application is a continuation-in-part. To illustrate the main features of the present invention, there is disclosed and claimed a system for automatically brewing coffee and then keeping the coffee hot until it is to be used.

In my aforesaid application there are two switches and two heat responsive members to control the switches, both of such members being influenced by the heat of the coffee pot and one of them being also heated by an auxiliary heating element.

The primary object of the present invention is to simplify the control system now claimed in the aforesaid application; specific objects being to eliminate one of the switches and the auxiliary heating means for one of the heat responsive members.

The objects and advantages of the present invention will more fully appear from the following detailed description taken in connection with the accompanying drawing, wherein:

Figure 1 as a side elevation of a coffee making utensil embodying the present invention, a portion of the bowl or brewing receptacle being broken away; Fig. 2 is a section on a larger scale, on line 2—2 of Fig. 1; and Fig. 3 is a bottom plan view on a still larger scale of the pot, proper, with the dished base member removed.

In the drawing I have illustrated my invention as applied to a conventional coffee brewing utensil comprising a pot and a brewing bowl; and for the sake of brevity, the detailed description will be confined to this particular adaption, although the invention is suitable for other uses.

In the drawing 1 is the coffee pot, proper, surmounted by a brewing bowl 2 that has a long conical spout 2ª extending down into the pot. A dish shaped member 3, secured to the under side of the pot, serves as a base and forms the housing for the heating and control system. In the bowl is the usual strainer 4 that allows liquids to flow in either direction between the pot and the bowl. A C-shaped heating element 5 fits into a correspondingly shaped channel 6 in the under side of the bottom of the pot and is brazed to the latter so as to be immovable. On the under side of the pot bottom are four lugs 7, 8, 9 and 10, preferably brazed to the pot; all of the lugs being located on a diameter of the pot bottom, with lug 7 at about the center. A bolt 11, extending up through base member 3 into lug 7, holds that member to the pot. Anchored at one end to lug 8, and in metallic contact therewith, is a bimetallic bar 12, while a second such bar, 14, is anchored at one end to lug 9; these bars being aligned with each other with their free ends spaced apart from each other. A latch comprising two arms, 15 and 16, arranged at right angles to each other to form an L, is hung from lug 10 by a pivot pin 17 that is at right angles to the center line of the heat responsive members. Arm 15 of the latch is horizontal and overlies the free end of bar 12; whereas arm 16 is vertical, extending down past the free end of bar 14 and having at its lower end a hook 18. Bar 14 has at its free end a down turned portion 19 that curves outwardly and downwardly. The parts are so proportioned that with arm 16 in the vertical position and the bar cold, the part 19 on the bar stands directly above the hook and is latched against downward movement.

Below bar 14 is a switch, shown as comprising an upper blade 20 and a lower blade 21. These blades are anchored at their middle to lug 9, little blocks of insulating material, 22 and 23, spacing the arms from the lug and from each other, respectively; and a screw 24 serving to secure the assembly of arms and blocks to the lug.

Current is supplied through a suitable cord C; wire 25 being connected to the tail end of switch arm 20 and wire 26 leading to one end of the heating element 5. A short wire 27 connects the other end of the heating element to the tail of switch arm 21. Therefore, when the switch is closed, current flows through the heating element, provided that the cord has been plugged into a socket forming part of a distribution system.

The free end of switch arm 21 projects beyond the corresponding end of the other switch arm and is there provided with a vertically adjustable stop in the form of a screw 28. Bar 14 is provided on its under side, just inwardly from the curved end, with a little button 29 that engages the stop 28 when bar 14 swings down. Bar 12 is also provided with a stop in the form of a screw 30 just below the free end of the horizontal arm of the latch.

Bar 12 is so constructed that its free end swings up as the temperature of the bar increases. Bar 14, on the other hand, does just the opposite, the free end moving or tending to move down with increase in temperature. Therefore bar 12 acts to trip the latch while bar 14 acts to open the normally closed switch.

With the parts in the positions shown in Fig. 2, the pot being cold, or at least cool, the switch is closed and bar 14 is latched with its free end held clear of the switch. Water having been placed in the pot and ground coffee having been placed in the brewing bowl, the cord may be plugged in and current flow through the heating element. As the pot becomes heated, the two heat responsive bars also become hot and the water boils and is forced up into the bowl by the steam that is generated in the pot. The free end of member 12 starts to move up and the free end of member 14 tends to move down. Since the latch restrains the switch actuating bar from swinging down, stresses are built up in the bar so that, by the time bar 12 has swung up sufficiently to pull hook 18 out from under part 19 on member 14, there has been stored up in the latter enough energy to drive the free end of the same down sharply and abruptly open the switch. After member 14 has once been unlatched it cannot swing up into latching position again until the pot has cooled to a predetermined low temperature which should be somewhat below the temperature at which the coffee is to be kept after it has been brewed and flowed back into the pot. The switch closes, however, before this low point in temperature is reached and the bar 14 latched in its raised position, the temperature of the pot rises and member 14 moves down again and opens the switch. Therefore the member 14 need only be so designed that it will open the switch, while unlatched, whenever the temperature of the pot is at or a little above the temperature at which it is desired to keep the coffee after brewing the same.

While there has been illustrated and described only a single embodiment of the invention, numerous changes and modifications thereof will occur to those skilled in the art and it is intended in the appended claims to cover all those changes and modifications that fall within the true spirit and scope of the present invention.

I claim:

1. In combination, an object to be heated, an electrical heating element therefor, a switch to control the flow of current through said heating element, two heat responsive members in good heat conductive relation to said object, the first of said members operating to open the switch when said object is above a predetermined low temperature, a latch that tends constantly to move into position to restrain the first heat responsive member against functioning, and the second heat responsive member having a part that engages the latch and moves it into the release position when the temperature of said object reaches a predetermined high value.

2. In combination, an object to be heated, an electrical heating element therefor, a switch to control the flow of current through said heating element, two heat responsive members anchored at corresponding ends in good heat conductive relation to said object and having their other ends free and spaced apart from each other, said members flexing in opposite directions relatively to each other under corresponding temperature changes, the first of said members acting directly on the switch to hold it open whenever the temperature of said object is above a predetermined low value, unless restrained from doing so, a latch located between the free ends of said members for engaging the first member and restraining it from functioning, and the free end of the second heat responsive member engaging the latch and tripping the same when said object attains a predetermined high temperature.

3. A combination as set forth in claim 2, wherein the latch is biased to enter into latching relation to the first heat responsive member whenever the temperature of said object drops to a predetermined level below said predetermined value.

4. A combination as set forth in claim 3, wherein the first heat responsive member cannot enter into latched relation with the latch, after unlatching, until said object has become relatively cool.

5. Heating means for a coffee pot comprising an electrical pot heating element, a switch to control the flow of current through said element, two heat responsive members in good heat conductive relation to the pot, the first of said members being in position to engage the switch and open it when the pot is at a temperature somewhat below the boiling point of water, a pivoted latch to restrain the first heat responsive member against functioning, and the second heat responsive member being in position to trip the latch when the pot reaches the brewing temperature.

6. Heating means as set forth in claim 5, wherein the latch and the first of the heat responsive members are so calibrated that the latter cannot return into latching relation to the latch until the pot cools to a predetermined point at which the coffee is no longer hot.

7. In an automatic coffee maker comprising a pot, an electrical heating element for said pot, means for controlling said heating element to cause said pot to attain a predetermined high temperature and thereafter to be maintained at a relatively lower temperature comprising, the combination of an electrical switch for controlling the flow of current through said heating element, a first heat responsive member in good heat conductive relation with said pot, a second heat responsive member in good heat conductive relation with said pot, means operatively connecting said second heat responsive member with said switch, a latch engageable with said second heat responsive member for preventing said second heat responsive member from operating said switch, and means on said latch engageable by said first heat responsive member to release said latch upon said pot reaching a predetermined high temperature, said second heat responsive member controlling said switch following release of said latch to maintain said pot at a temperature substantially lower than said predetermined high temperature.

8. In an automatic coffee maker comprising a pot, an electrical heating element for said pot, means for controlling said heating element to cause said pot to attain a predetermined high temperature and thereafter to be maintained at a relatively lower temperature comprising, the combination of an electrical switch for controlling the flow of current through said heating element, a first heat responsive member in good heat conductive relation with said pot, a second heat responsive member in good heat conductive relation with said pot, said heat responsive members having their longitudinal axes substantially coaxial, means operatively connecting said second heat responsive member with said switch, a latch engageable with said second heat responsive member for preventing said second heat responsive member from operating said switch, and means on said latch engageable by said first heat responsive member to release said latch upon said pot reaching a predetermined high temperature, said second heat responsive member controlling said switch following release of said latch to maintain said pot at a temperature substantially lower than said predetermined high temperature.

9. In an automatic coffee maker comprising a pot, an electrical heating element for said pot, means for controlling said heating element to cause said pot to attain a predetermined high temperature and thereafter to be maintained at a relatively lower temperature comprising, the combination of electrical switch means for controlling the flow of current through said heating element, a first heat responsive member in good heat conductive relationship with said pot, a second heat responsive member in good heat conductive relationship with said pot, means operatively connecting said second heat responsive member with said switch means, latch means engageable with said second heat responsive member for preventing said second heat responsive member from operating said switch means to interrupt the current flowing through said heating element, and means on said latch engageable by first heat responsive member for operating said latch and releasing said second heat responsive member to interrupt the current flowing through said heating element upon said pot reaching a predetermined high temperature, said second heat responsive member controlling said switch means following the attainment of said predetermined high temperature by said pot to maintain said pot at a temperature substantially lower than said predetermined high temperature.

AUGUST C. PURPURA.

References Cited in the file of this patent

UNITED STATES PATENTS

| Number | Name | Date |
| --- | --- | --- |
| 1,461,878 | Harvey | July 17, 1923 |
| 1,728,785 | Claytor | Sept. 17, 1929 |
| 1,839,935 | Thomas | Jan. 5, 1932 |
| 2,023,114 | Biebel | Dec. 3, 1935 |
| 2,262,286 | Ireland | Nov. 11, 1941 |
| 2,281,319 | Newell | Apr. 28, 1942 |
| 2,504,728 | Purpura | Apr. 18, 1950 |